Jan. 8, 1935.   R. A. WOODARD   1,987,456
COOLING SYSTEM
Filed Aug. 11, 1932
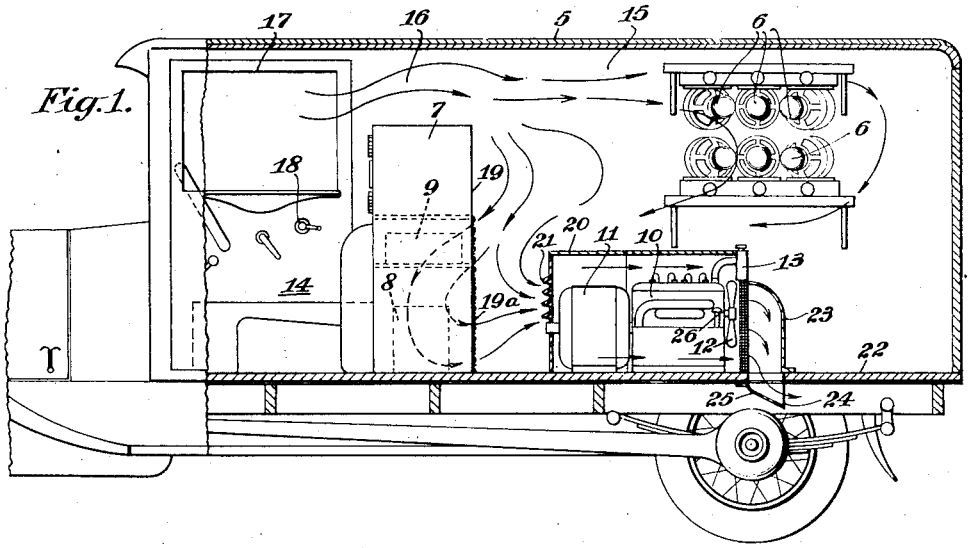
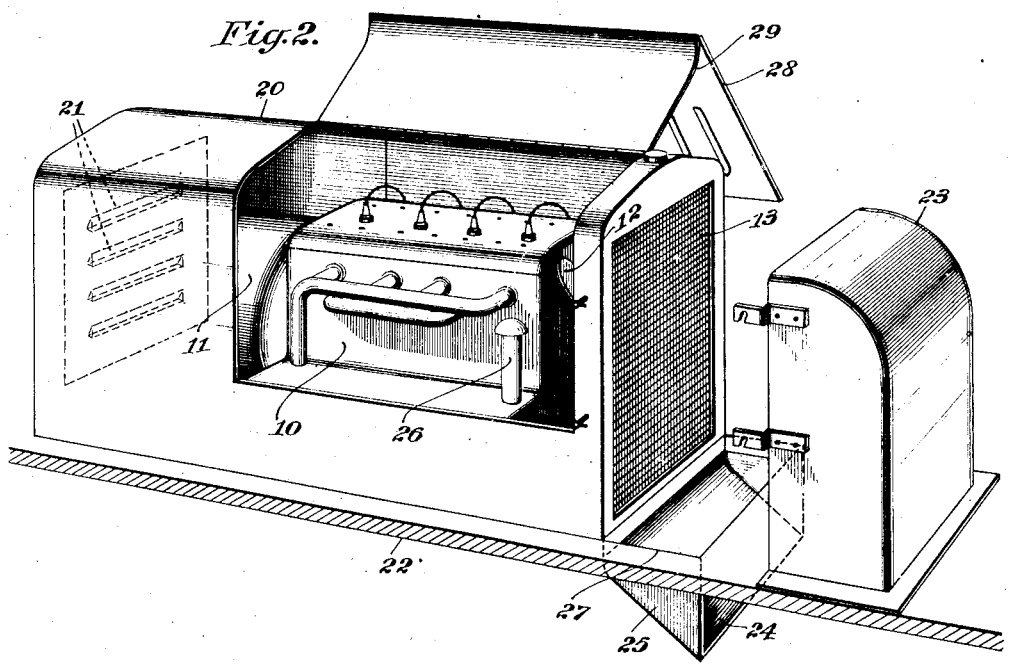
INVENTOR:
Randolph A. Woodard,
BY J. R. Goldsborough
HIS ATTORNEY.

Patented Jan. 8, 1935

1,987,456

UNITED STATES PATENT OFFICE 1,987,456

COOLING SYSTEM

Randolph A. Woodard, Palmyra, N. J., assignor to Radio Corporation of America, a corporation of Delaware Application August 11, 1932, Serial No. 628,323

6 Claims. (Cl. 98—2)

The present invention relates to cooling systems for chambers, compartments and enclosed spaces in apparatus housings, vehicles and the like, containing electrical and other apparatus which in operation generate heat. More particularly, the present invention relates to air cooling systems for apparatus housings including electrical generating equipment and is particularly adapted for mobile sound producing apparatus.

In apparatus of the character referred to, the closed interior of a vehicle body is adapted to house electrical sound producing devices, including electrical generating equipment. Such equipment develops relatively large quantities of heat and, in the close confines of a vehicle body or other enclosing chamber, may cause the air temperature of the enclosure to rise to excessively high values, particularly if augmented by the heat generated by other portions of the apparatus.

In the present preferred form of mobile sound producing apparatus, an auxiliary prime mover and electric generator are required to furnish electrical power to the apparatus. The heat generated by such prime mover and generator is considerably augmented by the heat generated by current flow in the amplifier apparatus, the field coils of the sound producing devices, the vacuum tubes and the like. Various expedients have been tried without any appreciable degree of success, to remove the heat by circulation of the air and its withdrawal through suitable openings in the roof or walls of the enclosure. Aside from the difficulty presented in rendering such openings weather proof, the use of fans and the like in such openings, as a means combined therewith for removing heated air from chambers or housings such as provided in a vehicle body containing electrical apparatus and generating equipment, has been found generally to be inadequate or undesirable mechanically.

It is, therefore, an object of the present invention to provide an improved cooling system for enclosed heat generating apparatus, that obviates the many disadvantages characteristic of known cooling systems for such purposes and that is of simple construction and is easily applied to existing apparatus.

It is a further object of the present invention to provide an improved cooling system for enclosed heat generating apparatus including an internal combustion engine or the like, having a cooling fan associated therewith.

It is a still further object of the invention to provide an improved cooling system for the interior of a vehicle body or other housing provided with a generating unit having a fan, wherein the generating equipment is included in and made to form part of the cooling system.

An auxiliary prime mover which is particularly adapted for mobile equipment, is an internal combustion engine, such as an ordinary water-cooled gasoline motor, and, in such equipment or apparatus, is directly connected to a suitable electric generator. The cooling system of the motor includes the usual rotary fan and a radiator through which the fan causes cooling air to flow.

In accordance with the invention, in a present preferred embodiment thereof, generating equipment of the above character is enclosed in a casing provided with air inlet means at one end, adjacent to the generator, and with air outlet means communicating with the radiator. The cooling fan of the engine is arranged to cause the cooling air to be drawn from the apparatus cha ber through the inlet openings of the casing and to pass first about the generator and secondly about the engine, and then through the radiator from which it is conducted finally through a short conduit and exhausted to atmosphere outside and below the body of the vehicle.

The cooling air intake is through windows or other upper openings, preferably adjacent to the front of the vehicle, from which it is drawn in circulating currents through the entire body and the interior of the vehicle, before entering the casing of the generating equipment.

The invention will, however, be better understood from the following description when taken in connection with the accompanying drawing, and its scope will be pointed out in the appended claims.

In the drawing, Figure 1 is a cross-sectional view of a vehicle body or apparatus housing provided with a cooling system embodying the invention; and Fig. 2 is a view in perspective, on an enlarged scale, and partly in section, of a portion of the system associated with the generating equipment.

Referring to the drawing, 5 is a vehicle body representing any suitable enclosure means or housing adapted to contain electrical apparatus and the like, which in operation produces heat. In the present example, the body or housing contains sound producing apparatus in the form of a plurality of sound producing devices or loud speakers 6, amplifying apparatus contained in an interior casing 7, and indicated generally at 8 and 9 therein, and electrical generating apparatus including an internal combustion engine 10 and an electrical generator 11. The cooling fan and radiator for the engine are indicated respectively at 12 and 13 and apart from the operations hereinafter described function in the usual manner to cool the fluid employed in the cooling system.

It has been found that when employing a plurality of apparatus units, which in operation generate appreciable quantities of heat, in an enclosed space such as the interior of a vehicle as shown, the cooling fan of the engine becomes substantially ineffective to cool the fluid and serves merely to circulate the air within the chamber or enclosure. Furthermore, the heat developed by the engine and the generator, together with that generated by operation of other apparatus, causes the enclosure or chamber to become excessively hot and the temperatures therein may often reach undesirably high levels whereat certain portions of the apparatus, such as wax filled radio condensers, transformers and the like, may deteriorate.

It has further been found that the expedient of mounting ventilating fans in the walls or roof is substantially ineffective to reduce the interior temperatures to desired low levels for efficient operation of the apparatus therein.

In vehicles such as mobile sound producing apparatus the operating compartment indicated generally in Fig. 1 at 14 may also lie within a region of relatively high temperatures and cause excessive discomfort to the operator who must maintain his position in order to effectively operate the apparatus.

Accordingly, as a preferred arrangement in a mobile sound producing apparatus, the casing 7 for the electrical amplifying apparatus is arranged to form a transverse partition extending across the interior of the housing 5 to separate the operating compartment 14 from the remainder of the interior of the housing or apparatus chamber 15. It will be noted that the casing or partition 7 is spaced from the top wall of the housing to provide a communicating channel 16 between the operating compartment 14 and the apparatus chamber 15.

It is preferable that the communicating channel be located adjacent to the top wall or roof of the housing as shown, and any suitable means providing a similar air inlet passage for the apparatus chamber 15 may be provided.

The purpose of the communicating channel or air inlet passage 16 between the operating compartment 14 and the apparatus chamber 15 is to admit air to the apparatus compartment at one end thereof and along the top wall. In the present example, this air inlet passage is provided by extending the partition wall or casing 7 transversely across the interior of the housing and adjacent to the top wall, but in spaced relation thereto as shown.

The air inlet to the housing 5 may be provided by any suitable means such as openings in one end of the housing, provided in the present example by the windows 17, which may be opened and closed to regulate the air inlet to the housing by suitable operating means indicated at 18. Such means are regularly provided on vehicles of the type shown, but in the connection with certain other types of enclosures, suitable regulating means of a similar character may be provided whereby the air admitted to the chamber 15 may be controlled by controlling the flow of air through the inlet channel 16.

It will be seen that the partition wall or casing 7 serves to isolate the operating compartment 14 from the heat generating apparatus represented by the prime mover 10 and the generator 11, as well as the additional apparatus which also generates heat in operation, represented by the sound producing devices 6 and the amplifying apparatus 8 and 9 in the casing 7. For the purpose of ventilating the last named apparatus, the casing 7 is provided with a grilled rear wall 19, as indicated at 19a, through which air currents from the inlet channel 16 may flow, as indicated by the dotted air lines shown in Fig. 1.

The above described arrangement, substantially as shown in Fig. 1, is, at present, preferred for vehicles containing electrical and other associated apparatus such as that required for mobile sound producing systems. In connection with any housing or chamber for apparatus of that character, or other electrical apparatus which in operation generates heat, the arrangement is preferably such that the cooling air is admitted at one end of the enclosing chamber adjacent to the top wall thereof and that the cooling air is drawn into the chamber and caused to circulate through it, finally being discharged from the chamber exteriorly of the housing.

In mobile sound producing equipment it is preferable that the cooling air be discharged below the vehicle and in any installation wherein apparatus which in operation generates relatively large quantities of heat or which in operation produces undesirable fumes, in accordance with the invention, is enclosed within an air conducting casing through which the cooling air is caused to pass, immediately before being exhausted from the housing, whereby the fumes and excessive heat generated thereby are exhausted directly to atmosphere.

By way of example of an arrangement of the above character, and as a preferred arrangement in mobile sound producing equipment, the electric generating unit, as the major source of undesired heat, is enclosed in an air conducting casing 20 having inlet means such as louver openings 21 at one end for admitting air currents thereto and having outlet means at the opposite end through which the air currents may pass from the casing.

In the present example, the outlet means is provided by the radiator 13 through which the air currents pass, thereby serving to cool the radiator in the usual manner. The air currents from the radiator are conducted exteriorly of the housing and below the lower wall or floor indicated at 22 thereof through short conduit means 23 connected with the outlet end of the casing or the radiator in the present example, and terminating below the floor or lower wall in a belled opening 24 provided with a baffle wall 25 for directing the air currents in a rearward direction from the housing, whereby the removal of the exhaust air from the cooling system may be aided by movement of the vehicle in the normal forward direction.

It will be noted that the casing at 20 is arranged to surround and fully enclose the heat generating apparatus in spaced relation thereto, whereby air currents flowing through the casing from the inlet end to the outlet end may surround the heat generating apparatus and provide between it and the casing a heat insulating layer of moving air. By this arrangement radiation of heat from the unit is impeded and, therefore, does not cause an excessive rise in temperature of the enclosing chamber, wherein other apparatus is located. Furthermore, by this arrangement the cooling system is required only to remove heated air from the chamber as produced by the apparatus therein, while the major heat generating apparatus is wholly and effectively insulated therefrom. It will further be noted that the cooling air is finally exhausted from the chamber 15 through the major heat generating apparatus, and is then immediately and directly discharged to atmosphere exteriorly of the housing and the chamber. This is a desirable arrangement, since the slightly heated air from the auxiliary or utilization apparatus in the chamber may be used as the cooling means for the heated or fume-producing apparatus and the heated or vapor-laden air is not permitted to enter the apparatus chamber. As a cooling fluid for the radiator, however, the heated air is satisfactory, since the heat generated by the motor itself and the connected generator is safely below the normal operating temperature for the cooling fluid in the radiator system.

The generator 11 is located adjacent to the air inlet means 21 whereby the inlet air is drawn from the generator toward the engine 10 and then is passed directly to the exhaust conduit 23. By this arrangement the generator 11 is maintained at a lower temperature than it would otherwise be since it is not materially affected by the temperature of the engine, and any excess heat, and oil fumes from the engine, such as may in operation be discharged from the usual breather pipe indicated at 26, are delivered immediately to atmosphere exteriorly of the housing.

It will be seen more particularly in connection with Fig. 2, that the exhaust conduit 23 is arranged to be readily detachable from the radiator and from the floor opening indicated at 27 and communicating, as shown, with the bell-shaped outlet 24, whereby the radiator may be inspected. Likewise, the casing 20 is hinged at the top, whereby it may readily be opened for inspection of the engine as indicated in Fig. 2, wherein a hinged side wall 28 and top wall 29 are shown in the open position.

Since, in the apparatus of the present example, the generating unit is provided with a cooling fan 12, the same is preferably utilized as the means for causing a circulation of the cooling air stream, although circulation of said cooling air stream may be provided by any other suitable means located in connection with the housing or the chamber 15, to cause a flow of cooling air sufficient to be fully effective in maintaining the temperature at a desired level within the chamber 15 and about the apparatus therein.

For mobile sound producing apparatus, which includes an electric generating unit having an internal combustion engine the cooling system for the engine and for the apparatus preferably is combined as shown and described in connection with the present system.

From the foregoing description it will be seen that, in accordance with the invention, an improved cooling system for apparatus which in operation generates heat and which apparatus is mounted in a chamber or other enclosure, may be provided by mounting the major portion of the heat generating apparatus in a casing within the chamber and then admitting cooling air currents at one end of the chamber and preferably adjacent to the top wall thereof and then exhausting said cooling air currents from the chamber through the casing.

The arrangement of the apparatus within the casing is such that the cooling air currents are caused to surround the same as a heat insulating envelope and to pass around the more highly heated and vapor producing portions thereof just prior to being expelled through the exhaust conduit.

It will further be seen that in a preferred embodiment of the invention, the cooling air currents are expelled from the housing or apparatus chamber in a downward and rearward direction in the case of mobile apparatus, whereby the forward motion of the vehicle serves to aid in the removal of the exhaust cooling air.

When, as in the present example, the major heat producing apparatus is an electrical generating unit, including an internal combustion engine provided with a cooling fan, the latter, it has been found, may serve effectively to create the stream of cooling air, as has been shown and described, without reducing the efficiency of the engine cooling system.

While a cooling system embodying the invention has been shown and described in connection with a mobile sound producing equipment having an electrical generating unit, it should be understood that it may be applied to other types of apparatus for effectively cooling the same when enclosed in similar housings.

I claim as my invention:

1. In a cooling system for enclosed heat producing apparatus, means providing a chamber for said apparatus, a prime mover and a generator, a cooling system including a radiator and a fan associated with said prime mover, an enclosing casing for said prime mover and generator within said chamber, said casing having air inlet means communicating with the interior of the chamber and air outlet means communicating with the exterior thereof, said inlet and outlet means being so arranged with respect to the fan that a stream of cooling air is caused to be withdrawn by operation of said fan from the interior of the chamber and expelled therefrom through said casing about the generator, the prime mover, and through the radiator, in the order given.

2. The combination with an apparatus housing having an air inlet means, of means providing an apparatus chamber therein communicating at one end with said air inlet means, and means in said apparatus chamber for causing cooling air to be drawn from said inlet means through said chamber and to be exhausted exteriorly thereof, said means including an electric generating unit including a cooling system, having a fan and a radiator, a casing surrounding said unit and said unit being so arranged that cooling air is admitted thereto at one end from the apparatus chamber and discharged therefrom at the opposite end through the radiator, and means for conducting the exhaust cooling air from said last named end of the casing exteriorly of the chamber and housing.

3. The combination with an apparatus housing, of means providing a cooling system therefor and including a partition wall extending transversely across the interior of the housing in spaced relation to the top wall, thereby to provide an air passage over said partition, heat generating apparatus within said partition, an elongated casing mounted adjacent to the floor longitudinally of said housing, heat generating apparatus in said housing adjacent to said casing and exterior thereof, said casing having an inlet opening adjacent to said partition wall and an outlet opening, a conduit communicating with said last named opening and extending through the floor exteriorly of the housing, and means in said casing for causing air to be drawn from the interior of the housing through the inlet opening to said casing and to exhaust through said conduit.

4. The combination with a closed vehicle body adapted to provide an apparatus housing, of transverse partition means arranged in spaced relation to a top wall of said body to provide an air passage through the interior of the body and an apparatus chamber on one side of said partition means, heat generating apparatus within said partition, a casing within said chamber having air inlet means at one end thereof and air outlet means at the opposite end thereof, heat generating apparatus in said housing adjacent to said casing and exterior thereof, heat producing apparatus located in said casing, and means associated with said apparatus in said casing for causing a stream of cooling air to be drawn from the interior of the chamber through said casing and expelled exteriorly of said housing and chamber.

5. In a mobile sound generating apparatus including a housing, the combination of a transverse partition arranged to divide the interior of said housing into two communicating compartments, means forward of said partition for admitting cooling air from the exterior of said housing to one of said compartments, a plurality of heat producing apparatus units rearward of said partition in the other compartment, a casing mounted within the apparatus compartment, said casing having air inlet means communicating with the interior of the housing and air outlet means communicating with the exterior of the housing, an electrical generator within said casing adjacent the inlet end thereof, and a prime mover adjacent to the outlet end thereof, said casing being arranged in spaced relation to and about said generating unit and prime mover, and a fan associated with the prime mover for creating an air current through said casing, and said air outlet means including an outlet conduit for said casing having an outlet opening for directing exhaust cooling air in a predetermined direction from said housing.

6. The combination with a closed vehicle body adapted to provide an apparatus housing, of transverse partition means arranged in spaced relation to a top wall of said body to provide an air passage through the interior of the body and an apparatus chamber on one side of said partition means, a casing within said chamber having air inlet means at one end thereof adjacent to said partition means and air outlet conduit means at the opposite end thereof leading exteriorly of the chamber and housing, heat generating apparatus in said housing adjacent to said casing and exterior thereof, heat producing apparatus located in said casing, and means associated with said apparatus in said casing for causing a stream of cooling air to be drawn from the interior of the chamber through said air inlet means and said casing, and to be expelled exteriorly of said housing and chamber through said outlet conduit means.

RANDOLPH A. WOODARD.